(12) United States Patent
Chen et al.

(10) Patent No.: US 8,140,585 B2
(45) Date of Patent: Mar. 20, 2012

(54) METHOD AND APPARATUS FOR PARTITIONING AND SORTING A DATA SET ON A MULTI-PROCESSOR SYSTEM

(75) Inventors: Liang Chen, Shanghai (CN); Kuan Feng, Shanghai (CN); Yonghua Lin, Beijing (CN); Sheng Xu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 294 days.

(21) Appl. No.: 12/508,628

(22) Filed: Jul. 24, 2009

(65) Prior Publication Data

US 2010/0031003 A1     Feb. 4, 2010

(30) Foreign Application Priority Data

Jul. 30, 2008  (CN) .......................... 2008 1 0134393

(51) Int. Cl.
    *G06F 17/30*      (2006.01)
(52) U.S. Cl. ........................ 707/802; 707/752
(58) Field of Classification Search ................. 707/700, 707/737, 747, 748, 752, 764, 792, 802, 822; 718/100
    See application file for complete search history.

(56) References Cited

U.S. PATENT DOCUMENTS

| | | | | |
|---|---|---|---|---|
| 5,842,207 A * | 11/1998 | Fujiwara et al. | ........................ | 1/1 |
| 5,987,468 A * | 11/1999 | Singh et al. | ............................ | 1/1 |
| 6,366,911 B1 * | 4/2002 | Christy | ........................... | 707/737 |
| 6,427,148 B1 * | 7/2002 | Cossock | ........................ | 707/700 |
| 6,477,523 B1 * | 11/2002 | Chiang | ................................ | 1/1 |
| 6,505,188 B1 * | 1/2003 | Ghazal et al. | ................... | 707/714 |
| 6,757,675 B2 * | 6/2004 | Aiken et al. | ........................... | 1/1 |
| 6,978,458 B1 * | 12/2005 | Ghosh et al. | ................... | 718/100 |
| 2003/0120647 A1 * | 6/2003 | Aiken et al. | ....................... | 707/3 |
| 2004/0117345 A1 * | 6/2004 | Bamford et al. | ................... | 707/1 |

* cited by examiner

*Primary Examiner* — Cam-Linh Nguyen
(74) *Attorney, Agent, or Firm* — Robert R. Williams

(57) ABSTRACT

The present invention provides a method and apparatus for partitioning, sorting a data set on a multi-processor system. Herein, the multi-processor system has at least one core processor and a plurality of accelerators. The method for partitioning a data set comprises: partitioning iteratively said data set into a plurality of buckets corresponding to different data ranges by using said plurality of accelerators in parallel, wherein each of the plurality of buckets could be stored in local storage of said plurality of accelerators; wherein in each iteration, the method comprises: roughly partitioning said data set into a plurality of large buckets; obtaining parameters of said data set that can indicate the distribution of data values in that data set; determining a plurality of data ranges for said data set based on said parameters; and partitioning said plurality of large buckets into a plurality of small buckets corresponding to the plurality of data ranges respectively by using said plurality of accelerators in parallel, wherein each of said plurality of accelerators, for each element in the large bucket it is partitioning, determines a data range to which that element belongs among the plurality of data ranges by computation.

11 Claims, 9 Drawing Sheets

METHOD AND APPARATUS FOR PARTITIONING AND SORTING A DATA SET ON A MULTI-PROCESSOR SYSTEM

FIELD OF THE INVENTION

The present invention relates to the data processing field, and more particularly, to a method and apparatus for partitioning a data set as well as a method and apparatus for sorting a data set on a multi-processor system.

BACKGROUND OF THE INVENTION

Data sorting is a common process which is frequently used in data analyzing in industry and commerce domains.

In general, in a single-processor data processing system as shown in FIG. 1, data sorting mainly involves the three stages: 1) collecting data to be sorted from main storage; 2) using processing core to sort the fetched data; 3) distribute sorted data back to the main storage.

With the semiconductor process approaching its limit, increasing the processing node number in a data processing system compared to improving continuously the capability of a single processor through advance of semiconductor process is more feasible in the near future.

FIG. 2 shows the architecture of a conventional multi-processor system. As shown in FIG. 2, the multi-processor system generally has a plurality of processors operating on a shared main memory, including one core CPU and a plurality of Accelerated Processing Unit (APU).

For example, the Cell Broadband Engine (CBE) is a single-chip multi-processor system, which has 9 processors operating on a shared main memory, including a Power Processing Unit (PPU) and 8 Synergistic Processing units (SPU). Under such system architecture, the CBE can provide outstanding data computing capability. Thus, for data sorting on a large data set, if a multi-processor system such as CBE is used, the performance of sorting process could be significantly improved.

However, in a multi-processor system such as CBE, in order that a plurality of accelerators perform data sorting in parallel on a data set to be sorted, the data set needs to be partitioned evenly to accommodate the size of local storages of the accelerators, therefore, the main process stages comprise: 1) partitioning the data set to be sorted and distributing it from the main memory to the plurality of accelerators; 2) the plurality of accelerators performing sorting in parallel on respective data thereof; 3) converging data sorting results of the plurality of accelerators into the main memory.

However, in the above process, how to specifically partition data set and how to converge data sorting results are yet challenges today.

Furthermore, in general, in a multi-processor system, the capacity of local storage of each accelerator is limited, since it will be very high cost to equip each accelerator with huge local storage. For example, in the CBE, the capacity of local storage of each SPU is 256 KB, which is not sufficient for a large data set.

Thus, if the data set is not well partitioned, then when a plurality of accelerators performing respective sorting tasks in parallel, data swap operation may need to be performed repeatedly between each of the accelerators and the main memory by using DMA operations, a lots of data swap operations will make the main memory operation less efficient, since memory bandwidth between the main memory and the plurality of accelerators generally is limited. For example, in the CBE, the memory bandwidth between SPUs and the main memory can only be maintained at about 25.6 GB/s, which will be shared by 8 SPUs.

In addition, if the data set is not well partitioned, then it is also possible that when the plurality of accelerators performing respective sorting tasks, each of the accelerators needs to perform data communication with other accelerators, which will also cause low sorting efficiency.

Therefore, it should be taken into consideration that if data sorting is performed on a multi-processor system such as CBE, data swap operations between main memory and accelerators and between accelerators should be reduced.

Furthermore, in a typical data sorting algorithm, lots of branch (compare) operations exist; however, for a multi-processor system such as CBE, the ability for branch operation is relatively weak. This is also a problem that should be taken into consideration when performing data sorting on a multi-processor system such as CBE.

Based on the above consideration, there is a need for designing a data partitioning and sorting solution that are suitable for a multi-processor system such as CBE.

SUMMARY OF THE INVENTION

In view of the above problems, the present invention provides a method and apparatus for partitioning a data set as well as a method and apparatus for sorting a data set on a multi-processor system, so that on the multi-processor system such as CBE, the partitioning and sorting of a large data set is performed, in so far as possible, through computation of data instead of comparison between data, and through logical convergence of data instead of physical movement of data, so as to fully exert the advantage of high computation power owned by such multi-processor system.

According to one aspect of the invention, there is provided a method for partitioning a data set on a multi-processor system, wherein the multi-processor system has at least one core processor and a plurality of accelerators, the method comprising: partitioning iteratively said data set into a plurality of buckets corresponding to different data ranges by using said plurality of accelerators in parallel, wherein each of the plurality of buckets could be stored in local storage of said plurality of accelerators; wherein in each iteration, the method comprises: roughly partitioning said data set into a plurality of large buckets; obtaining parameters of said data set that can indicate the distribution of data values in that data set; determining a plurality of data ranges for said data set based on said parameters; and partitioning said plurality of large buckets into a plurality of small buckets corresponding to the plurality of data ranges respectively by using said plurality of accelerators in parallel, wherein each of said plurality of accelerators, for each element in the large bucket it is partitioning, determines a data range to which that element belongs among the plurality of data ranges by computation.

According to another aspect of the invention, there is provided a method for method for sorting a data set on a multi-processor system, wherein the multi-processor system has at least one core processor and a plurality of accelerators, the method comprising: partitioning data set to be sorted into a plurality of buckets corresponding to a plurality of different data ranges by using the above method for partitioning a data set on a multi-processor system; distributing said plurality of buckets from the main memory to said plurality of accelerators; performing data sorting on said plurality of buckets respectively by said plurality of accelerators in parallel; and writing back by said plurality of accelerators their sorted buckets into the main memory respectively according to the order of said plurality of different data ranges.

BRIEF DESCRIPTION OF THE DRAWINGS

It is believed that the features, advantages and purposes of the present invention will be better understood from the following description of the detailed implementation of the present invention read in conjunction with the accompanying drawings, in which.

DETAILED DESCRIPTION OF THE INVENTION

Next, a detailed description of the preferred embodiments of the present invention will be given with reference to the drawings.

Figure 1:
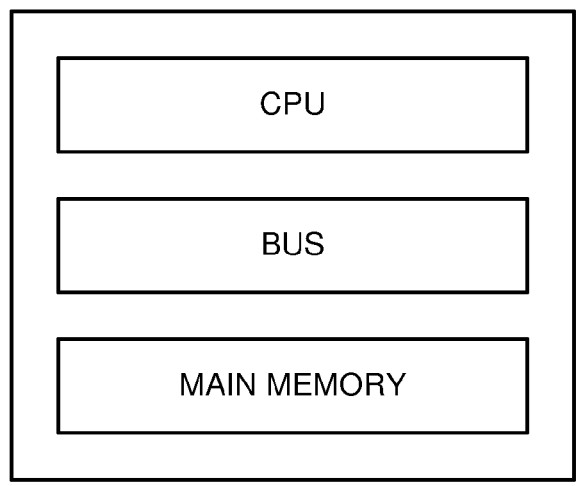
FIG. 1 is a block diagram of a single-processor system.
Figure 2:
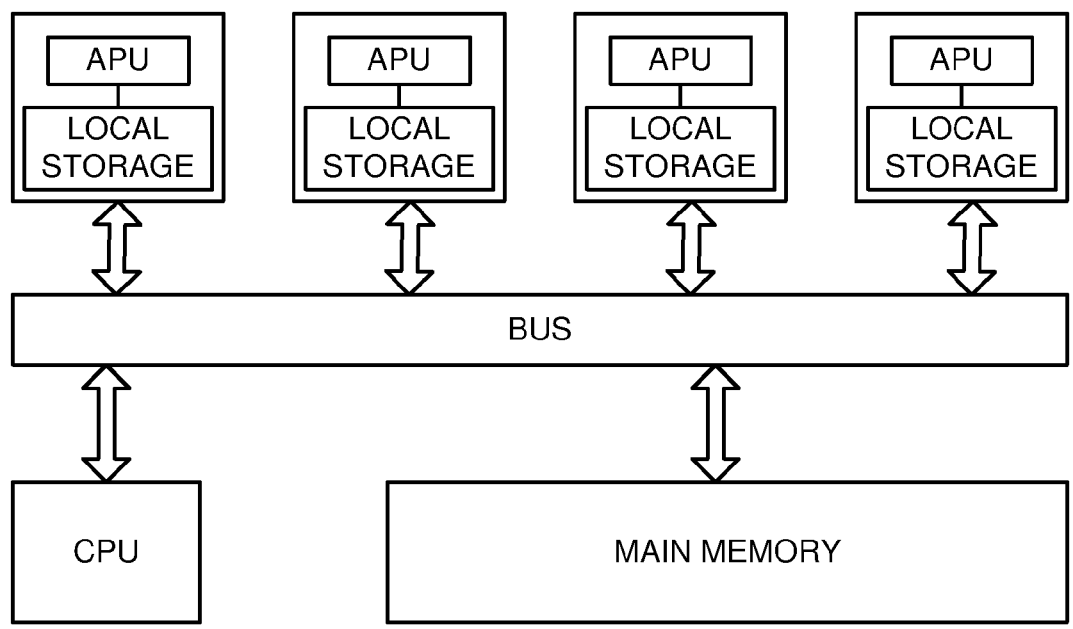
FIG. 2 is a block diagram of a multi-processor system.
Figure 3:
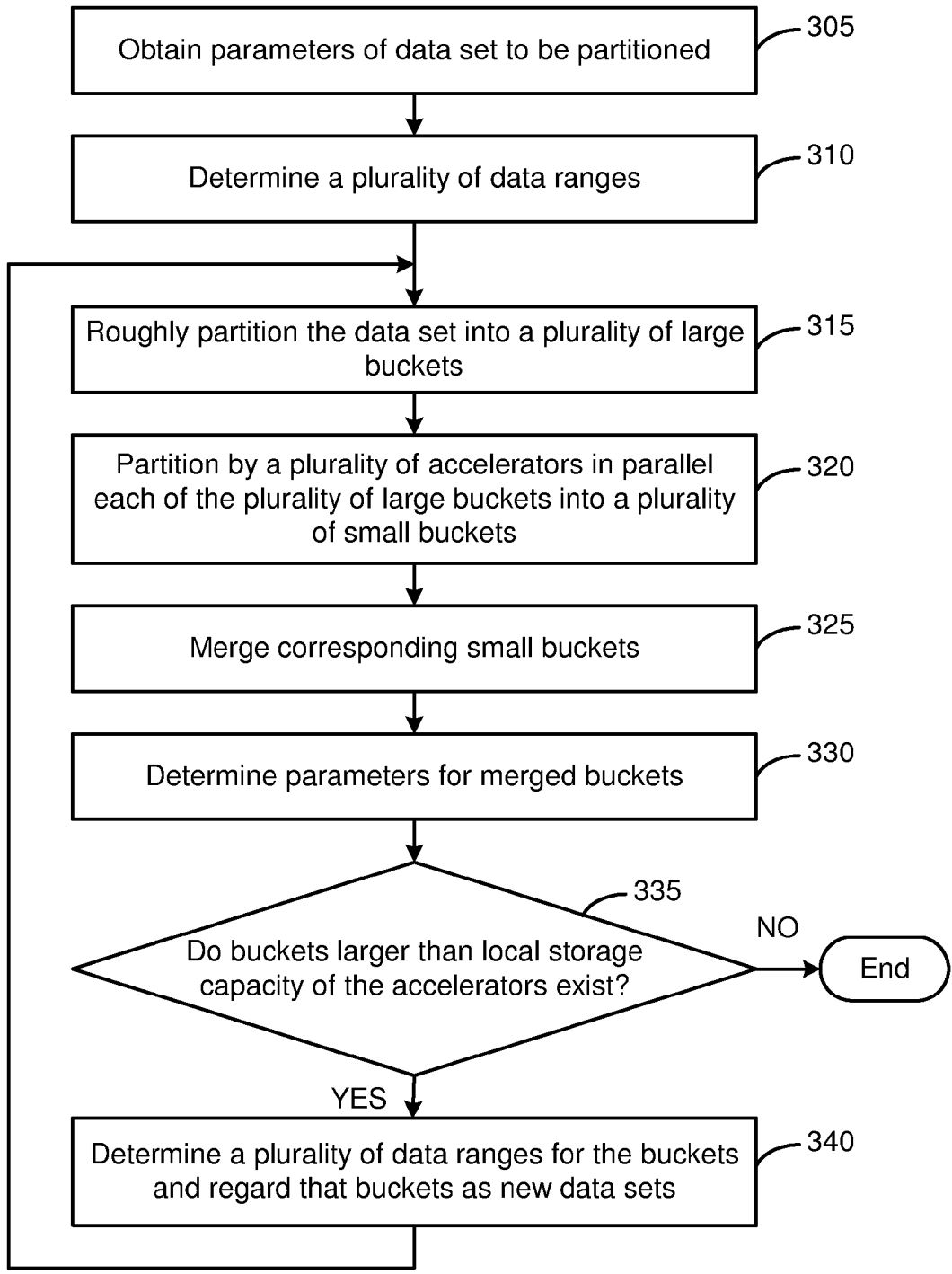
FIG. 3 is a flowchart of a method for partitioning a data set on a multi-processor system according to an embodiment of the invention.

FIG. 3 is a flowchart of a method for partitioning a data set on a multi-processor system according to an embodiment of the invention. Herein, the multi-processor system has at least one core processor and a plurality of accelerators. Specifically, the multi-processor system may be, for example, the above CBE with one PPU (core processor) and eight SPUs (accelerators). In addition, the data set to be partitioned is pre-stored in main memory of the above multi-processor system.

The method of the embodiment for partitioning a data set on a multi-processor system partitions said data set iteratively by using said plurality of accelerators in parallel, until said data set is partitioned into a plurality of small buckets corresponding to different data ranges and are all small than the capacity of local storages of said plurality of accelerators.

Specifically, as shown in FIG. 3, first at step 305, parameters of the data set to be partitioned that can substantially indicate the distribution of data values in that data set are obtained, the parameters could be, for example, average/variance or minimal value and maximal value of data values in that data set. Of course, the parameters could include average or variance of data values as well as minimal value and maximal value of data values.

And, in a preferred embodiment, the parameters of the data set are estimated based on that data set. In another embodiment, the parameters could be computed based on that data set.

At step 310, a plurality of data ranges is determined for the data set based on said parameters.

For example, in case that the parameters are average of data values estimated based on that data set and the average is 500, a plurality of data ranges 0-99, 100-199, 200-299, . . . , 900-999 with fixed step 100 could be determined for that data set. Of course, it is not limited to this. There exists a plurality of manners for determining data ranges. For example, weights could be set respectively for the highest four bits of binary representation of data, for example, weight $2^0$, $2^1$, $2^2$, $2^3$ could be set respectively for the highest four bits, and 16 different data ranges can be determined based on weighted sum of these highest four bits, that is, a data range where the weighted sum of the highest four bits of data is 1, a data range where the weighted sum of the highest four bits of data is 2, etc.

Figure 4:
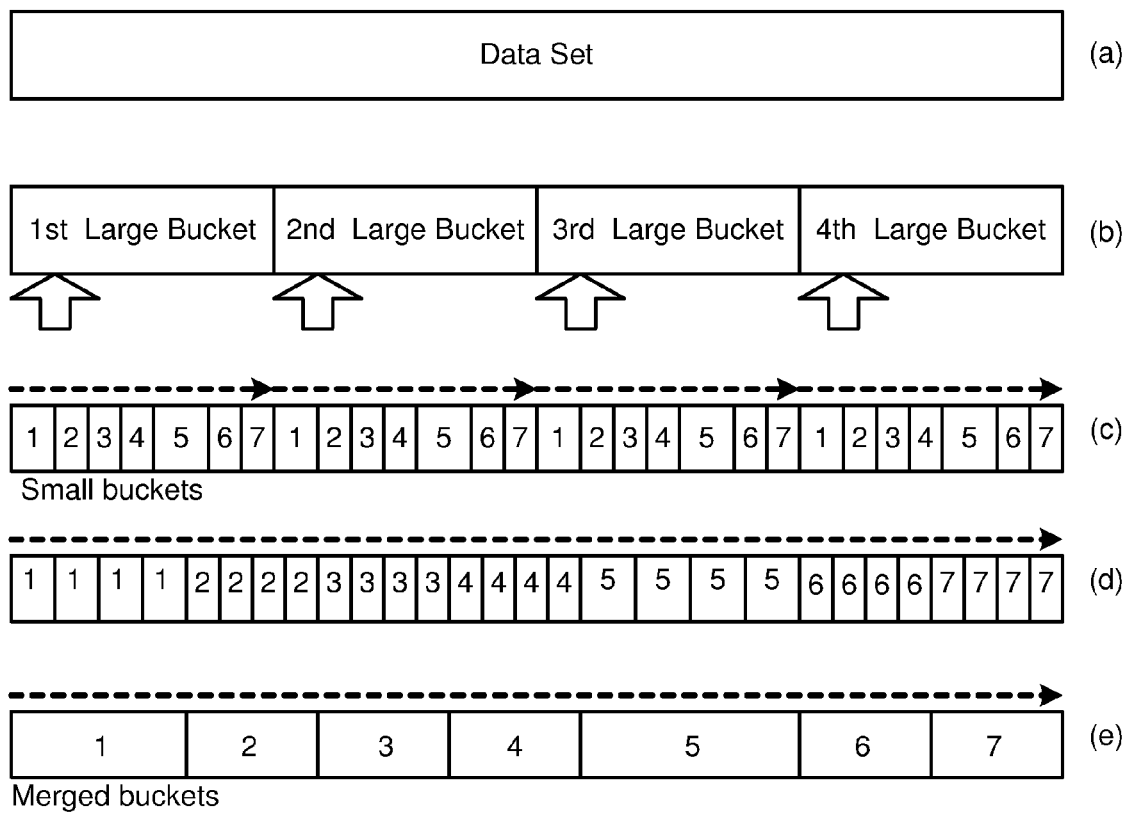
FIG. 4 is an overall illustration of the method of FIG. 3.

At step 315, the data set is roughly partitioned into a plurality of large buckets. In FIG. 4, as shown in (a) and (b), the data set is illustratively partitioned into four large buckets.

At this step, the purpose of roughly partitioning the data set into a plurality of large buckets is to enable said plurality of accelerators to further partition these large buckets respectively in parallel, so as long as the plurality of accelerators can operate on the data set in parallel, there is no special limitation on the manner of partition in the invention.

In one embodiment, at this step, the data set is evenly partitioned into a plurality of large buckets corresponding to the number of the plurality of accelerators. For example, in case of the above CBE with 8 SPUs, the data set is evenly partitioned into 8 large buckets. However, this is merely exemplary, in other embodiment, the data set may also be partitioned into more or less large buckets, and data amount of these large buckets could also be uneven.

At step 320, as shown in FIG. 4(c), the plurality of large buckets are partitioned respectively into a plurality of small buckets corresponding to the plurality of data ranges through computation, at the mean time, parameters of each of the plurality of small buckets that can precisely indicate the distribution of data values in the small bucket are generalized by said plurality of accelerators in parallel.

For instance, in case of the above plurality of data ranges of 0-99, 100-199, 200-299, . . . ,900-999, the plurality of accelerators are enabled to partition the plurality of large buckets respectively into a plurality of small buckets corresponding to these data ranges through computation in parallel. That is, for each of the plurality of large buckets, all the elements whose values are between 0-99 are partitioned into one small bucket through computation, and all the elements whose values are between 100-199 are partition into one small bucket, and so on, thereby forming a plurality of small buckets corresponding to data ranges 0-99, 100-199, 200-299 . . . , 900-999, respectively.

Figure 5:
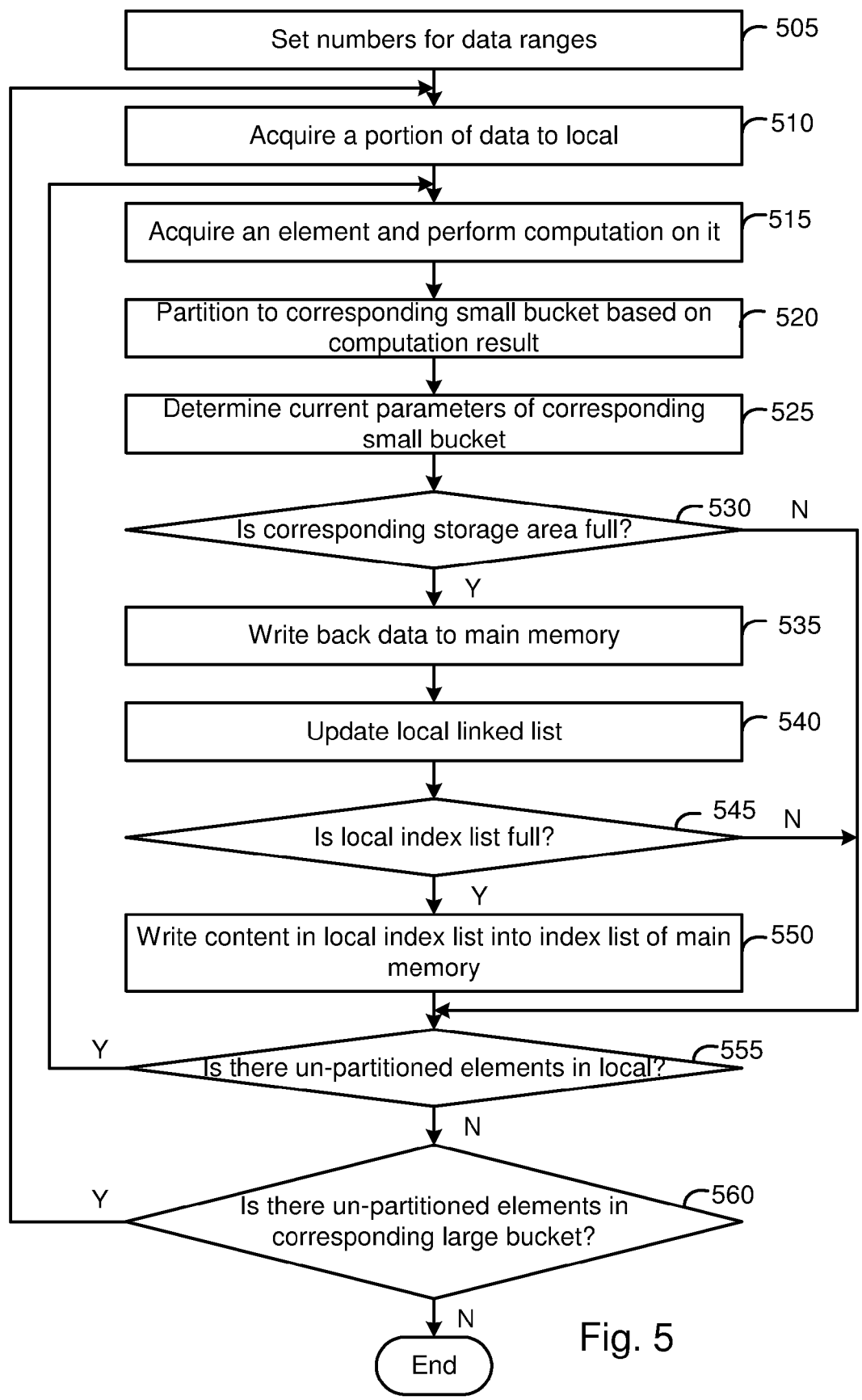
FIG. 5 is a detailed flowchart of step 320 for partitioning a large bucket into a plurality of small buckets in the method of FIG. 3 according to an embodiment of the invention.
Figure 6:
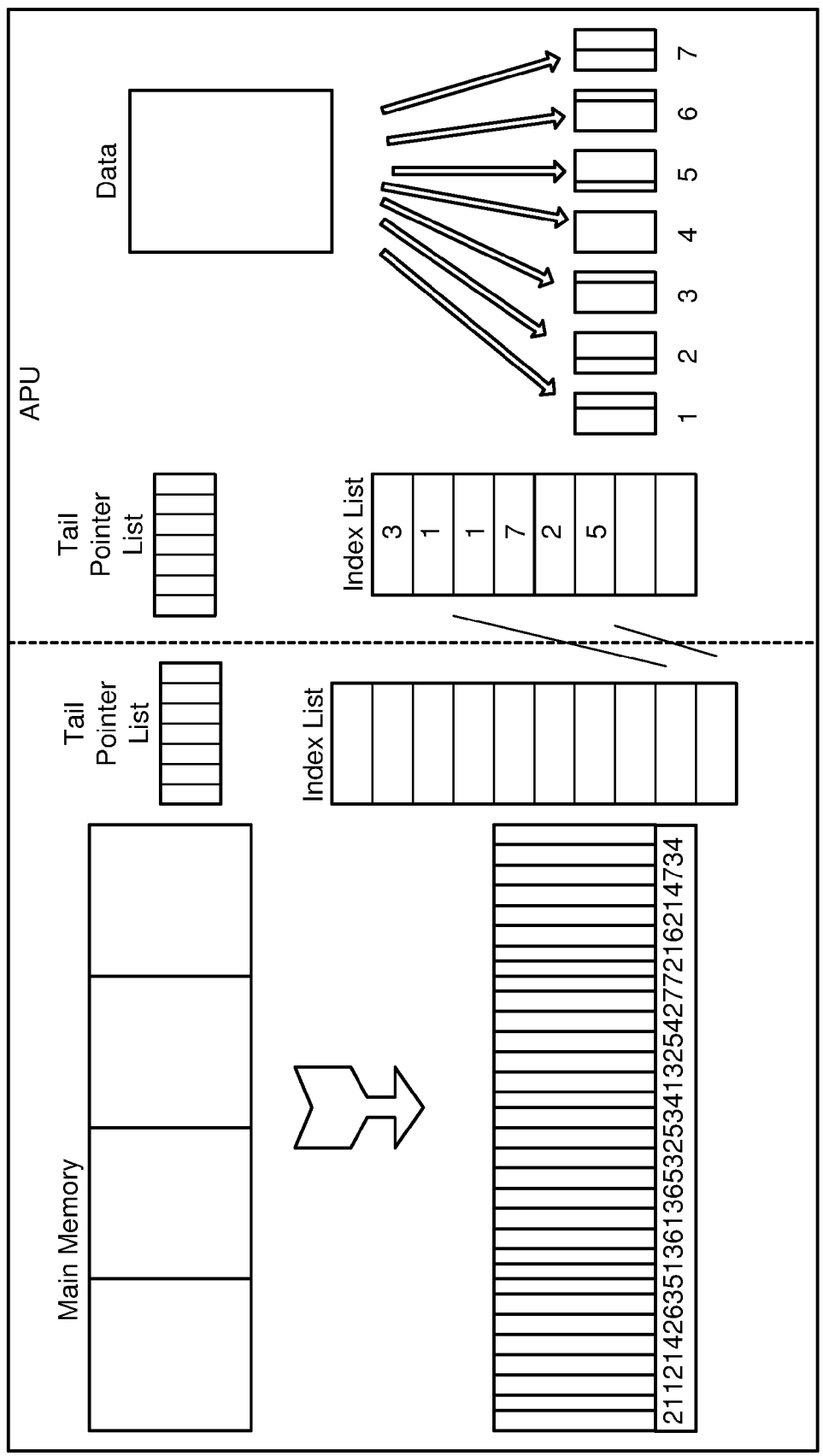
FIG. 6 is an illustration of the process of FIG. 5.

Next, the process of step 320 will be described in detail in conjunction with accompany drawings. FIG. 5 is a detailed flowchart of the process of step 320 according to an embodiment of the invention, by taking the partitioning of the large bucket by any one of the plurality of accelerators as an example. FIG. 6 is an illustration of that process.

In this embodiment, as shown in FIG. 6, in local storage of each of said plurality of accelerators and in the main memory, a linked list is set respectively for linking elements that belong to the same data range together. In one embodiment, the linked list is an inverted linked list that is composed of an index list and a tail pointer list. Herein, the index list includes a plurality of entries, the number of which is dependent on storage capacity. In addition, the tail pointer list also includes a plurality of entries, the number of which is at least equal to the number of the plurality of data ranges. That is, for each of the plurality of data ranges, the tail pointer list at least includes one entry corresponding to it. In addition, initially, all entries in the index list and the tail pointer list are set as 0.

As shown in FIG. 5, first at step 505, the process of step 320 according to this embodiment sets specific numbers for the plurality of data ranges.

For example, in case of the above plurality of data ranges of 0-99, 100-199, 200-299 . . . , 900-999, the data range 0-99 may be numbered as 1, and the data range 100-199 may be numbered as 2, and so on.

In addition, in case where weights $2^0$, $2^1$, $2^2$, $2^3$ are set respectively for the highest four bits of binary representation of data and 16 different data ranges are determined according to weighted sum of these highest four bits, the data range where the weighted sum of the highest four bits of data is 1 may be numbered as 1, the data range where the weighted sum of the highest four bits of data is 2 may be numbered as 2, and so on.

At step 510, a portion of data is acquired from the large bucket of the data set stored in the main memory, which is allocated to the accelerator, to local storage of that accelerator. Herein, the data amount of that portion is determined based on the capacity of the local storage of that accelerator.

In one embodiment, the local storage of that accelerator could be divided into two portions for storing data acquired from the main memory and the data having been partitioned respectively. In this case, taking the space occupied by the index list and the tail pointer list into consideration, the amount of that portion of data should be less than half of local storage capacity of that accelerator. However, it is not limited this, those skilled in the art can arrange the space of the local storage of that accelerator in any reasonable manner by using technical knowledge of the art.

At step 515, the accelerator is enabled to acquire an unpartitioned element from its local storage and associate that element with the number of the data range to which that element belongs through computation.

For example, in case of the above plurality of data ranges of 0-99, 100-199, 200-299, . . . , 900-999 which are numbered as 1, 2 . . . , respectively, through dividing the acquired element by the step of that plurality of data ranges, i.e. 100 and then rounding the result, the number of the data range to which that element belongs could be obtained. Herein, a CEILING (numerical expression) function could be used to perform rounding on the result of division. For example, CEILING (512/100) will return 6, in this case it can be determined that 512 belongs to the $6^{th}$ data range, i.e., the data range 500-599. However, it is not limited this, the data range 0-99 could also be numbered as 0, data range 100-199 be numbered as 1, and so on at step 505, and a floor (numerical expression) function could be used to perform rounding on the result of dividing the acquired element by said step. For example, floor (512/100) will return 5, thereby it can be determined that 512 belongs to the $5^{th}$ data range which is also the data range 500-599 in this case.

In addition, in the above case where 16 different data ranges are determined according to weighted sum of the highest four bits of binary representation of data which are number as 1, 2 . . . , by computing the weighted sum of the highest four bits of binary representation of the acquired element, the number of data range to which that element belongs could be obtained.

However, the above manner of numbering the plurality of data ranges sequentially, determining data range to which the acquired element belongs by performing computation on that element and associating the result of the computation with the number of the data range is only exemplary, as long as the element could be associated with the data range to which the element belongs through computation, any method can be used.

At step 520, based on the above computation result, the acquired element is partitioned into the data range whose number corresponds to that computation result, that is, into corresponding small bucket.

In this embodiment, as shown at right side of FIG. 6, in local storage of the accelerator, a storage area (portions labeled as 1, 2 . . . 7 in APU of FIG. 6) with fixed size such as 128B is allocated for each of the above plurality of data ranges, i.e., each of the plurality of small buckets, which is used to store data partitioned into that data range. In one embodiment, the allocation of storage areas is implemented by setting an array with fixed length such as 128B for each of the plurality of data ranges.

Therefore, at this step, partitioning the acquired element into the data range whose number corresponds to the computation result is to store that element into storage area in local storage of the accelerator corresponding to that data range.

At step 525, after partitioning of the element into the data range with corresponding number, that is, into corresponding small bucket, parameters that can precisely indicate the current distribution of data values in that small bucket are determined, such as average or variance as well as minimal value and maximal value of data values in that small bucket. Of course, the parameters may just be average or variance of data values, or may just be minimal value and maximal value of data values.

Since during the process of partitioning of the large bucket into a plurality of small buckets by said accelerator, elements in the large bucket must be traversed one by one, current minimal value and maximal value as well as average/variance of data values in respective small buckets could be determined simultaneously with the traversing. Thus, after all the elements in that large bucket are partitioned into corresponding small buckets, the final minimal value and maximal value as well as average/variance of data values of respective small buckets could be determined and taken as parameters that can precisely indicate the distribution of data values in that small buckets.

At step 530, it is determined if a storage area in the local storage of the accelerator corresponding to the above small buckets is full. If so, the process proceeds to step 535, otherwise, turn to step 555.

At step 535, elements in the storage area which is full are written back as a data stripe to the main memory.

Specifically, the accelerator writes that data stripe back in the main memory next to the data stripe of the large bucket the accelerator is partitioning, which was written back last time. That is, respective data stripes partitioned by that accelerator are overwritten sequentially on the large bucket to which these data stripes belong in the main memory. That is, the respective data stripes partitioned from the large bucket are still written back in the location of that large bucket. Therefore, it can be seen from FIG. 6 that, the data stripes partitioned by respective accelerators are stored in the main memory according to large buckets to which these data stripes belong.

At step 540, local linked list of said accelerator is updated.

Since among the plurality of storage areas allocated for the above plurality of data ranges in the local storage of that accelerator, upon a storage area is full, the accelerator will write back the data stripe therein to the main memory, it can be seen from FIG. 6 that, in the main memory, among data stripes belonging to a same large bucket which are written back by a same accelerator, the data stripes corresponding to the same data range, i.e., forming a small bucket, may not be continuously stored. Thus, these data stripes need to be linked together to form a small bucket logically corresponding to the data range.

In this embodiment, the aforementioned inverted linked list composed of the index list and the tail pointer list is used to accomplish this task.

Specifically, a plurality of entries in the local index list of said accelerator correspond one by one to the plurality of data stripes written back to the main memory sequentially by said accelerator and are used respectively to store related index of the corresponding data stripe. The related index indicates the position in the main memory of previous data stripe of the corresponding data stripe, which is partitioned from the same large bucket and belongs to the same data range as the corresponding data stripe. That is, the related index indicates numerical order of the previous data stripe among the data stripes written back into the same large bucket as that of the previous data stripe. Since as mentioned above, the sizes of respective data stripe are equal, such as all equal to 128B, the previous data stripe can be easily located in the corresponding large bucket in the main memory based on the index.

In addition, a plurality of entries in the local tail pointer list of said accelerator correspond respectively to one of the plurality of data ranges and are used respectively to indicate position of the last data stripe of the corresponding data range in the large bucket the last data stripe belongs to in the main memory.

In addition, the process of updating the inverted linked list at this step is as follows: firstly, an entry in the tail pointer list which corresponds to the data range the data stripe written back to the main memory at step 535 belongs to, is determined; secondly, value of that entry in the tail pointer list is written to an entry in the index list which corresponds to the above data stripe written back to the main memory to indicate the position of previous data stripe of that data stripe; thirdly, the entry in the tail pointer list is updated with the position of the data stripe written back to the main memory in large bucket the data stripe belongs to in the main memory, to indicate the position of the current last data stripe of that data range.

Thus, with the inverted linked list that is composed of the above index list and the tail pointer list, a plurality of data stripes that belong to one small bucket could be linked together from back to front, so as to form the small bucket as shown in FIG. 4(c) that is logically converged but physically dispersed.

At step 545, it is determined if the local index list of said accelerator is full. If so, the process proceeds to step 550, otherwise, turns to step 555.

At step 550, content in the local index list of said accelerator is written into the index list of the main memory.

Since as mentioned above, data stripes written back by respective accelerators are stored individually according to the large buckets to which these data stripes belong, indexes corresponding to these data stripes in the index list of the main memory are also correspondingly independent from each other according to the large buckets.

Thus, at this step, said accelerator should add the content in its local index list into portion in the index list of the main memory which corresponds to the large bucket the accelerator is partitioning.

At step 555, it is determined whether there still exists un-partitioned elements in the local storage of said accelerator, if exists, then the process returns to step 515 to continue to process other elements, otherwise, proceeds to step 560.

At step 560, it is determined whether there still exists un-partitioned elements in the large bucket allocated to the accelerator in the main memory, if exists, then the process returns to step 510 to continue to acquire next portion of data from the large bucket in the main memory to the local storage of the accelerator, otherwise, the process ends.

The above is a detailed description of the process of step 320 of FIG. 3 according to an embodiment of the invention.

Next, returning to FIG. 3, at step 325, after said plurality of large buckets are partitioned into a plurality of small buckets respectively, as shown in FIG. 4(d), in these plurality of large buckets, small buckets corresponding to a same data range are merged. Therefore, as shown in FIG. 4(e), said data set is eventually partitioned into a plurality of merged buckets corresponding to said plurality of data ranges.

For example, in case of the above plurality of data ranges of 0-99, 100-199, 200-299, . . . , 900-999, small buckets in said plurality of large buckets that correspond to data range 0-99 are merged into one bucket, small buckets that correspond to data range 100-199 are merged into one bucket, and so on.

At this step, the so-called merging of small buckets corresponding to a same data range is to, rather than physically merge these small buckets together, logically link all the data stripes belonging to the same data range in said data set together globally by using the index list and the tail pointer list in the main memory through regulating of the index list and the tail pointer list, to form merged bucket corresponding to that data range.

Specifically, as mentioned above, index content generated by respective accelerators are independent from each other in the index list of the main memory according to large buckets, and what are recorded in the local tail pointer list of respective accelerators are the positions of the last data stripes of various small buckets in corresponding large bucket.

Therefore, at this step, first, for the index list in the main memory, beginning with the indexes corresponding to the second large bucket therein, the indexes are modified to indicate global position of corresponding data stripes in the whole data set to replace those originally indicating position of the data stripes in corresponding large buckets. This may be implemented through summing total number of data stripes of each large bucket by using the index list, and then for each large bucket beginning with the second large bucket, increasing the values of the indexes corresponding to that large bucket by total number of data stripes of all large buckets in front of that bucket. Referring to FIG. 6, assuming that the first large bucket contains 8 data stripes, then index values of all entries in the index list of the main memory corresponding to the second large bucket is increased by 8. And, assuming that the second large bucket also contains 8 data stripes, then values of all indexes corresponding to the third large bucket is increased by 16, and so on, so as to implement the modification of index values in the index list from local indication to global indication.

In addition, for the local tail pointer list of each of said plurality of accelerators, similar to the index list in the main memory, the value of each entry therein should also be modified from original indicating of position of corresponding data stripe in large bucket to which the data stripe belongs to the indicating of global position of that data stripe in the whole data set.

In addition, at this step, head and tail indexes are also linked with each other among said plurality of large buckets in the index list of the main memory. That is, for the index list in the main memory, beginning with the indexes corresponding to the second large bucket therein, the index of the first data stripe of each small bucket of each large bucket is modified to indicate position of the last data stripe of corresponding small bucket in the previous large bucket based on modified content in the local tail pointer list of each of said plurality of accelerators. In particular, beginning with the second large bucket, for each large bucket, the first data stripe of each small bucket in that large bucket is located based on content in the local tail pointer list of the accelerator corresponding to the large bucket, and index entries of these first data stripes are modified to point to the last data stripes of corresponding small buckets in the previous large bucket based on content in the local tail pointer list of the accelerator corresponding to the previous large bucket. For example, assuming that the index value corresponding to the first data stripe in small bucket of data range 0-99 in the second large bucket is originally 0, which indicates there is no other data stripes of data range 0-99 in front of the first data stripe, and assuming that the position of the last data stripe in small bucket of data range 0-99 in the first large bucket is determined as 5 based on content in the local tail pointer list of the accelerator corresponding to the first large bucket, then the index value corresponding to first data stripe in the small bucket of data range 0-99 in the second large bucket is modified from 0 to 5, so as to link it to the last data stripe in the small bucket of data range 0-99 in the first large bucket.

In addition, at this step, content in the local tail pointer list of accelerator corresponding to the last large bucket is written into the tail pointer list of the main memory as the global tail pointers of the whole data set.

Thus, by modifying the index list and the tail pointer list in the main memory, all data stripes in the data set that belong to a same data range could be logically linked together, without the need to physically merge them together.

At step 330, for each of the plurality of merged buckets, parameters that can precisely indicate the distribution of data values in that merged bucket are determined based on the parameters generalized at step 320 for each small bucket that can precisely indicate the distribution of data values in that small bucket.

For example, based on average or variance, minimal value and maximal value of data values of each small bucket, average or variance, minimal value and maximal value of data values of each of the plurality of merged buckets could be determined.

At step 335, it is determined whether there are buckets larger than the local storage capacity of said plurality of accelerators in the plurality of merged buckets.

At this step, for each of the plurality of merged buckets, through generalizing total number of data stripes contained in that bucket by using the index list and the tail pointer list in the main memory and multiplying the total number by size of a data stripe such as the above 128 B, the size of that merged bucket can be obtained.

Figure 7:
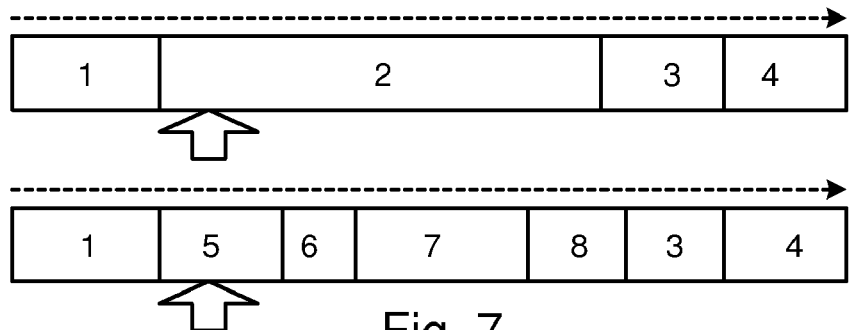
FIG. 7 is an illustration of steps 330, 340 in the method of FIG. 3.

And, if it is determined at this step that there are merged buckets larger than the local storage capacity of said plurality of accelerators, such as the bucket 2 in FIG. 7, the process proceed to step 340, otherwise, the process ends.

At step 340, for each of the merged bucket larger than the local storage capacity of said plurality of accelerators, a plurality of data ranges are determined based on the parameters determined at step 330 that can precisely indicate the distribution of data values in that bucket. Then, the process returns to step 315, to further partition these buckets with regarding them as new data sets, until size of all the resulting buckets are less than the local storage capacity of said plurality of accelerators. Thus, since parameters used in subsequent iteration are calculated based on the data set itself, the data partitioning will get more accurate.

The above is a detailed description of the method for partitioning a data set on a multi-processor system of this embodiment. In this embodiment, since the data set is partitioned into a plurality of buckets through computation of data rather than comparison between data, the method is especially suitable for the multi-processor system such as CBE with relatively poor branch capability, and can improve the performance for partitioning a data set on such a multi-processor system. In addition, since a plurality of data stripes that belongs to a same data range are linked as one bucket through a linked list, rather than merging data that belongs to a same data range into one bucket through physical movement of data, data movement cost during partitioning of a data set can be significantly reduced, and performance for partitioning data can be improved.

Next, a method for sorting a data set by using the method for partitioning a data set on a multi-processor system of the invention will be described.

Figure 8:
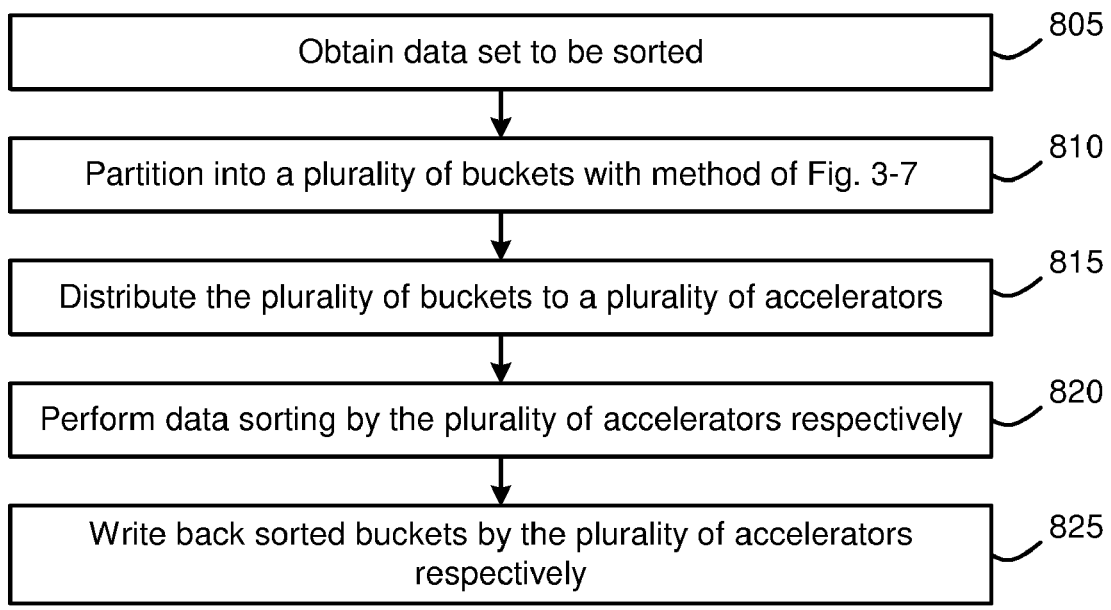
FIG. 8 is a flowchart of a method for sorting a data set on a multi-processor system according to an embodiment of the invention.

FIG. 8 is a flowchart of the method for sorting a data set on a multi-processor system according to an embodiment of the invention. Herein, the multi-processor system has at least one core processor and a plurality of accelerators. Specifically, the multi-processor system may be, for example, the above CBE with one PPU (core processor) and eight SPUs (accelerators).

As shown in FIG. 8, first, at step 805, a data set to be sorted is obtained and stored in the main memory.

At step 810, the data set to be sorted is partitioned into a plurality of buckets corresponding to a plurality of different data ranges by using the method for partitioning a data set on a multi-processor system in FIG. 3-7.

Figure 9:
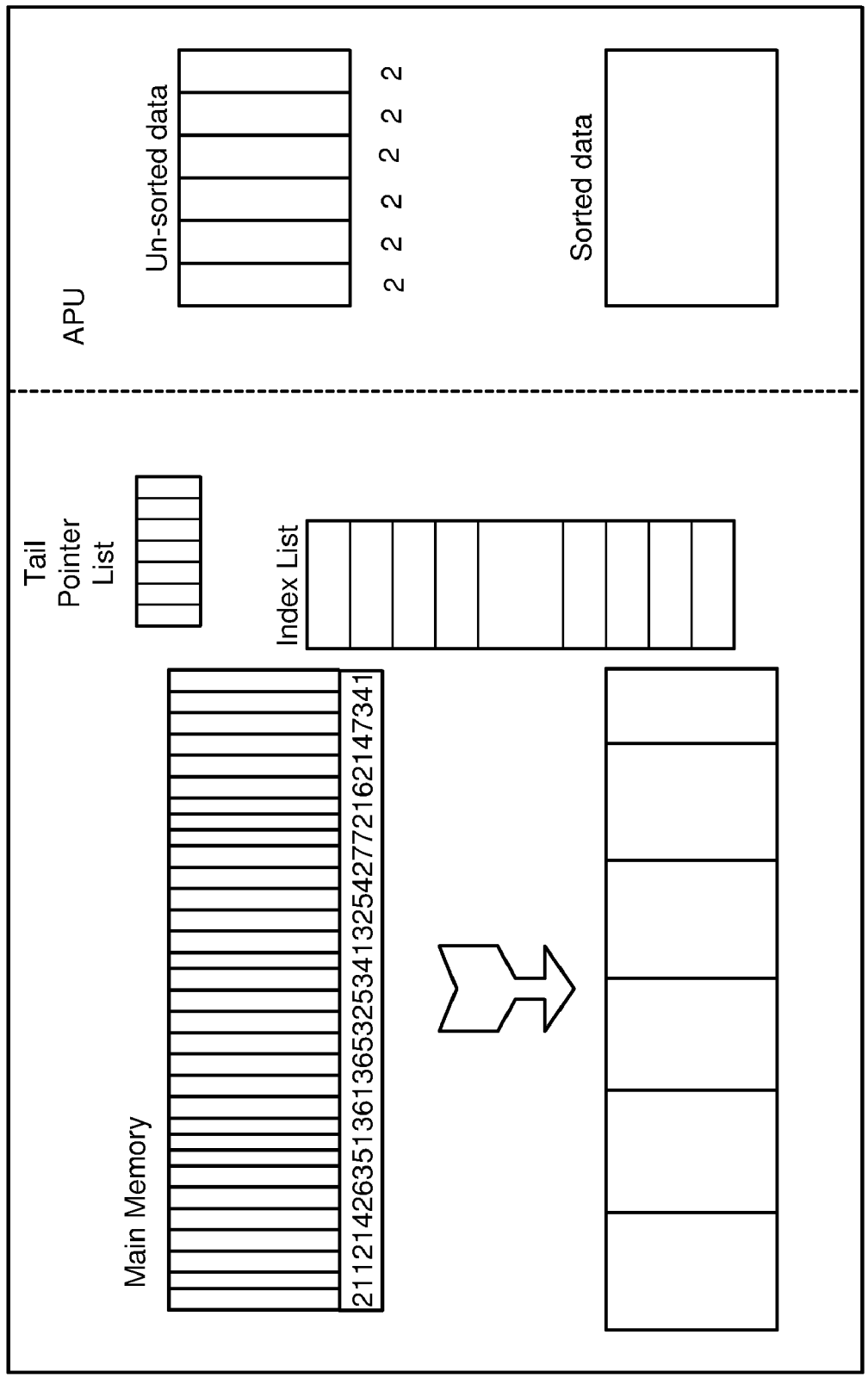
FIG. 9 is an illustration of the process of FIG. 8.

Herein, as shown in FIG. 9, each of the plurality of buckets includes a plurality of data stripes and these data stripes are logically converged and physically dispersed, these data stripes are linked together to form the bucket by means of a linked list in the main memory that is composed of an index list and a tail pointer list.

Next, at step 815, the plurality of buckets are distributed from the main memory to the plurality of accelerators.

During distribution, for each of the plurality of buckets, the last data stripe in that bucket is located based on value of corresponding entry in the tail pointer list of the main memory, and previous data stripes are located sequentially by using the index list, so that these data stripes are obtained sequentially from the main memory, and as shown at right side of FIG. 9, delivered to the local storage of corresponding accelerator as the bucket distributed to that accelerator.

At step 820, the plurality of accelerators are enabled to perform data sorting in parallel on the plurality of buckets respectively. Herein, there is no special limitation on the data sorting algorithm employed by the plurality of accelerators in the present invention, any data sorting algorithm presently known such as insert sort, bubble sort, select sort, etc or data sort algorithm future knowable may be used.

At step 825, as shown in FIG. 9, the plurality of accelerators write back their sorted buckets into the main memory respectively according to the order of the plurality of different data ranges.

The above is a detailed description of the method for sorting a data set on a multi-processor system of this embodiment. In this embodiment, since the data set to be sorted is partitioned into a plurality of buckets corresponding to a plurality of different data ranges, whose size is suitable for the local storage capacity of the plurality of accelerators, by using the method for partitioning a data set on a multi-processor system in FIG. 3-7, the plurality of accelerators can perform data sorting in parallel on that data set and data swap operations between accelerators and the main memory can be reduced, so that data sorting performance can be significantly improved.

Under the same inventive concept, the present invention provides an apparatus for partitioning a data set in a multi-processor system, which will be described below in conjunction with the drawings.

Figure 10:
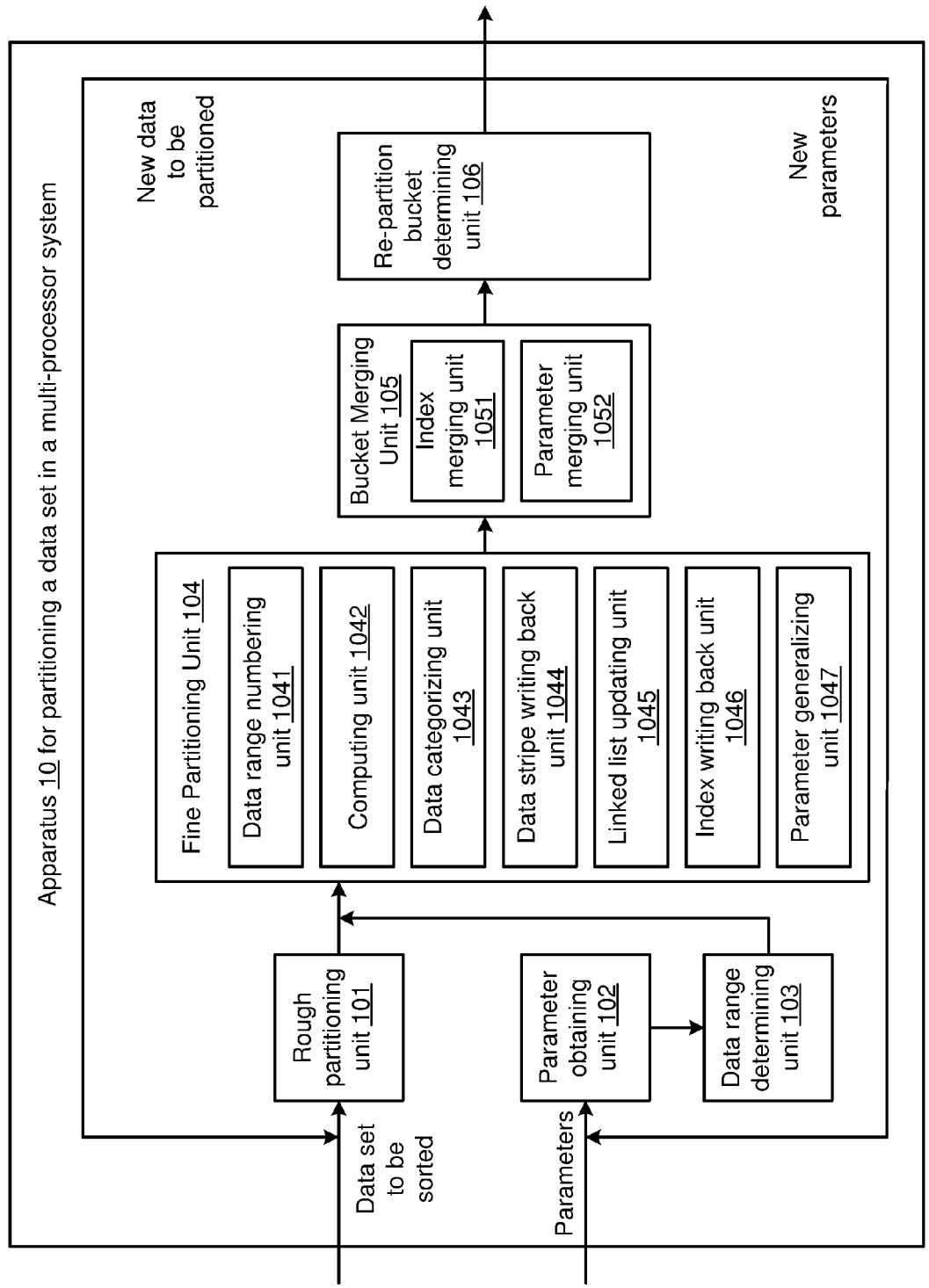
FIG. 10 is a block diagram of an apparatus for partitioning a data set in a multi-processor system according to an embodiment of the invention.

FIG. 10 is a block diagram of the apparatus for partitioning a data set on a multi-processor system according to an embodiment of the invention. Herein, the multi-processor system has at least one core processor and a plurality of accelerators. Specifically, the multi-processor system may be, for example, the above CBE with one PPU (core processor) and eight SPUs (accelerators).

As shown in FIG. 10, the apparatus 11 for partitioning a data set in a multi-processor system of this embodiment comprises: a rough partitioning unit 101, a parameter obtaining unit 102, a data range determining unit 103, a fine partitioning unit 104, a bucket merging unit 105 and a re-partition bucket determining unit 106.

The rough partitioning unit 101 roughly partitions the data set to be partitioned into a plurality of large buckets in each iteration.

The parameter obtaining unit 102 obtains parameter of said data set that can indicate the distribution of data values in that data set in each iteration.

In a preferred embodiment, the parameter of said data set that can indicate the distribution of data values in that data set in the first iteration is parameter estimated based on that data set that could roughly indicate the distribution of data values in that data set, and the parameter in subsequent iteration is accurate parameter generalized in the previous iteration.

In another embodiment, the parameter in the first iteration is also parameter calculated based on that data set that can accurately indicate the distribution of data values in that data set.

The data range determining unit 103 determines a plurality of data ranges for said data set based on said parameter in each iteration.

In one embodiment, the data range determining unit 103 determines a plurality of consecutive data ranges with fixed step for said data set. In another embodiment, the data range determining unit 103 determines a plurality of data ranges according to weighted sum of a plurality of bits of binary representation of data.

The fine partitioning unit 104 partitions said plurality of large buckets into a plurality of small buckets corresponding to the plurality of data ranges respectively by using said plurality of accelerators in parallel in each iteration, wherein each of said plurality of accelerators, for each element in the large bucket it is partitioning, determines a data range to which that element belongs among the plurality of data ranges by computation.

In this embodiment, in local storage of each of said plurality of accelerators, a storage area is set for each of said plurality of data ranges, respectively.

In addition, as shown in FIG. 10, the fine partitioning unit 104 further comprises a data range numbering unit 1041, a computing unit 1042 and a data categorizing unit 1043.

The data range numbering unit 1041 numbers the plurality of data ranges in each iteration.

The computing unit 1042 enables each of said plurality of accelerators to obtain each element sequentially from the large bucket it is partitioning and perform computation on that element so that the computation result corresponds to the number of data range to which that element belongs in each iteration.

In one embodiment, the computing unit 1042 enables each of said plurality of accelerators to, for each element it obtained, perform computation of dividing that element by value of fixed step of the plurality of data ranges and rounding the result, so that the result of rounding corresponds to the number of data range to which that element belongs. In another embodiment, the computing unit 1042 enables each of said plurality of accelerators to, for each element it obtained, perform computation of weighted sum of a plurality of bits of binary representation of the element, so that the value of that weighted sum corresponds to the number of data range to which that element belongs.

The data categorizing unit 1043 enables each of said plurality of accelerators to store each element in the large bucket the accelerator is partitioning, into the storage area of the accelerator's local storage corresponding to the data range to which that element belongs based on the computation result of the computing unit 1042 in each iteration.

In this embodiment, in the local storage of each of said plurality of accelerators, a linked list is set for respectively linking elements that belong to a same data range in the large bucket that accelerator is partitioning together to form small buckets, the linked list is composed of an index list and a tail pointer list.

As shown in FIG. 10, the fine partitioning unit 104 further comprises a data stripe writing back unit 1044 and a linked list updating unit 1045.

The data stripe writing back unit 1044, when it is determined that a storage area of one of said plurality of accelerators is full, enables said accelerator to write the elements in that storage area back as a data stripe to position of the large bucket said accelerator is partitioning in the main memory in each iteration.

The linked list updating unit 1045, after one of said plurality of accelerators wrote back a data stripe to the main memory, enables said accelerator to update the linked list in its local storage so as to link that data stripe with other data stripes in the large bucket that accelerator is partitioning, that belong to a same data range in each iteration.

In this embodiment, a linked list is set in the main memory for linking elements in said data set that belong to a same data range together, the linked list is composed of an index list and a tail pointer list.

As shown in FIG. 10, the fine partitioning unit 104 further comprises: an index writing back unit 1046 for, when determining that the local index list of one of said plurality of accelerators is full, enabling said accelerator to write content of its index list into a portion within the index list of the main memory which corresponds to the large buckets the accelerator is partitioning in each iteration.

As shown in FIG. 10, the fine partitioning unit 104 further comprises: a parameter generalizing unit 1047 for, in each iteration, enabling each of said plurality of accelerators to generalize in real time for each of the plurality of small buckets partitioned by it parameters that can precisely indicate the current distribution of data values in that small bucket during partitioning. The parameters comprise one or more of average/variance, minimal value and maximal value of data values.

The bucket merging unit 105 performs merging of a plurality of small buckets corresponding to a same data range among said plurality of large buckets in each iteration.

As shown in FIG. 10, the bucket merging unit 105 further comprises an index merging unit 1051 and a parameter merging unit 1052.

The index merging unit 1051, in each iteration, modifies said index list and said tail pointer list in the main memory so that each entry therein changes to indicate a global position of corresponding data stripe in the whole data set to replace that originally indicating a position of that data stripe in the large bucket it belongs to, and head and tail indexes are linked with each other among said plurality of large buckets.

The parameter merging unit 1052, in each iteration, for each of the merged buckets, determining parameters that can precisely indicate the distribution of data values in that merged bucket based on the parameters of the plurality of small buckets contained in that merged bucket that are generalized by the parameter generalizing unit 1047 in the fine partitioning unit 104.

The re-partition bucket determining unit 106, in each iteration, determines the buckets in the merged buckets larger than the capacity of local storage of said plurality of accelerators as new data sets to be partitioned.

The above is a detailed description of the apparatus for partitioning a data set in a multi-processor system of the present embodiment.

Next, an apparatus for sorting a data set that applies the apparatus 10 for partitioning a data set in a multi-processor system of the invention will be described.

Figure 11:
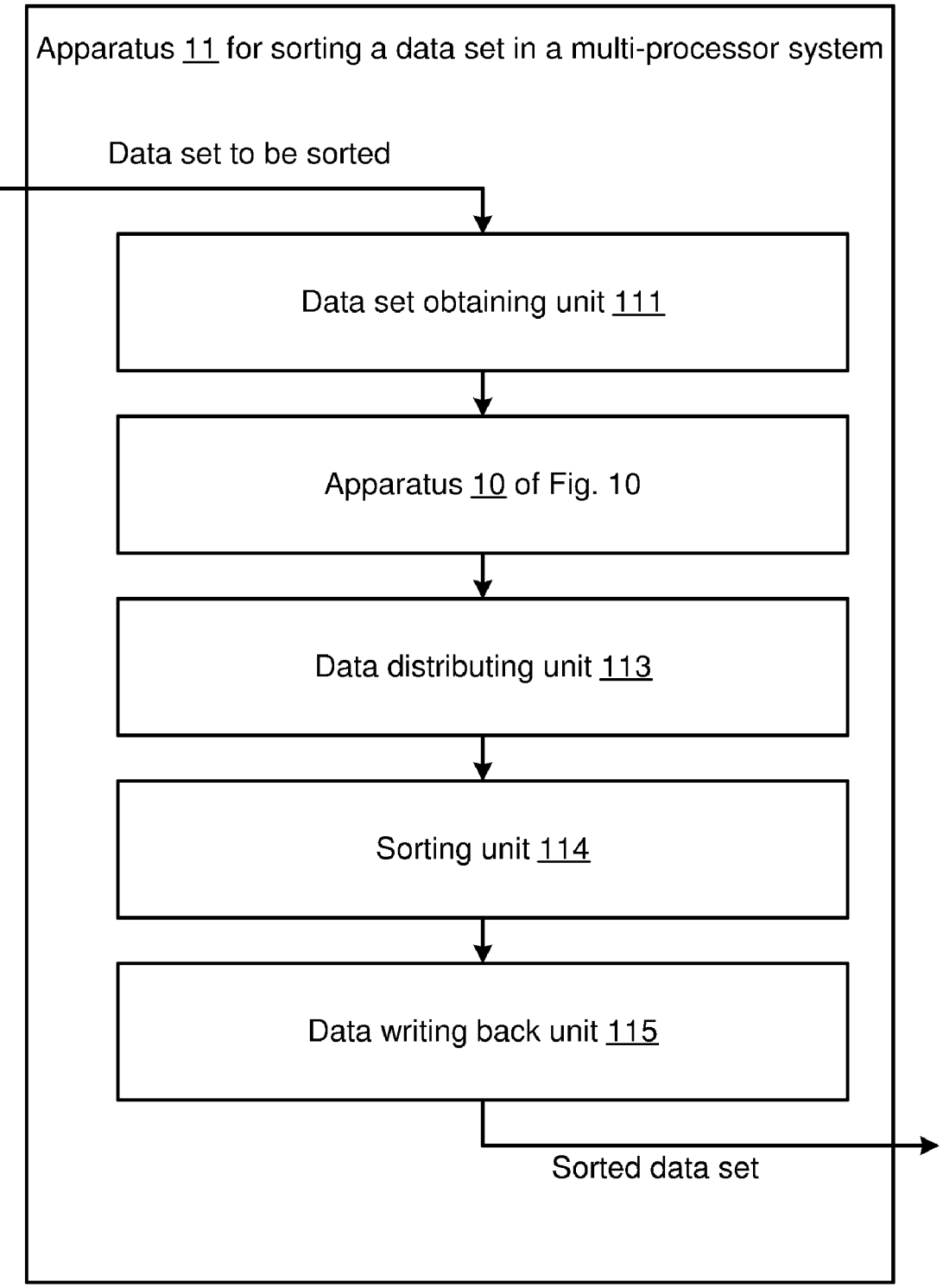
FIG. 11 is a block diagram of an apparatus for sorting a data set in a multi-processor system according to an embodiment of the invention.

FIG. 11 is a block diagram of an apparatus for sorting a data set in a multi-processor system according to an embodiment of the invention. Herein, the multi-processor system has at least one core processor and a plurality of accelerators. Specifically, the multi-processor system may be, for example, the above CBE with one PPU (core processor) and eight SPUs (accelerators).

As shown in FIG. 11, the apparatus 11 for sorting a data set in a multi-processor system of the present embodiment comprises: a data set obtaining unit 111, the apparatus 10 for partitioning a data set in a multi-processor system of FIG. 10, a data distributing unit 113, a sorting unit 114 and a data writing back unit 115. The data set obtaining unit 111 obtains a data set to be sorted and stores it in the main memory.

The apparatus 10 for partitioning a data set in a multi-processor system of FIG. 10 partitions said data set to be sorted into a plurality of buckets corresponding to a plurality of different data ranges.

The data distributing unit 113 distributes said plurality of buckets from the main memory to said plurality of accelerators.

The sorting unit 114 enables said plurality of accelerators to perform data sorting in parallel on said plurality of buckets, respectively.

The data writing back unit 115 enables said plurality of accelerators to write back their sorted buckets into the main memory respectively according to the order of said plurality of different data ranges.

The above is a detailed description of the apparatus for sorting a data set in a multi-processor system of the present embodiment. Therein, the apparatus 10 and 11 and the components thereof can be implemented with specifically designed circuits or chips or be implemented by a computer (processor) executing corresponding programs.

While the method and apparatus for partitioning a data set and the method and apparatus for sorting a data set on a multi-processor system of the present invention have been described in detail with some exemplary embodiments, these embodiments are not exhaustive, and those skilled in the art may make various variations and modifications within the spirit and scope of the present invention. Therefore, the present invention is not limited to these embodiments, the scope of which is only defined by appended claims.

The invention claimed is:

1. A method for partitioning a data set on a multi-processor system, wherein the multi-processor system has at least one core processor and a plurality of accelerators, the method comprising:

partitioning iteratively said data set into a plurality of buckets corresponding to different data ranges by using said plurality of accelerators in parallel, wherein each of the plurality of buckets could be stored in local storage of said plurality of accelerators;

wherein in each iteration, the method comprises:

roughly partitioning said data set into a plurality of large buckets;

obtaining parameters of said data set that can indicate the distribution of data values in that data set;

determining a plurality of data ranges for said data set based on said parameters; and partitioning said plurality of large buckets into a plurality of small buckets corresponding to the plurality of data ranges respectively by using said plurality of accelerators in parallel, wherein each of said plurality of accelerators, for each element in the large bucket it is partitioning, determines a data range to which that element belongs among the plurality of data ranges by computation;

wherein in the local storage of each of said plurality of accelerators, storage areas are set for said plurality of data ranges, respectively; and the step of partitioning said plurality of large buckets into a plurality of small buckets corresponding to the plurality of data ranges respectively by using said plurality of accelerators in parallel further comprises:

numbering the plurality of data ranges;

performing computation by each of said plurality of accelerators, for each element in the large bucket the accelerator is partitioning, so that the computation result corresponds to the number of data range to which that element belongs; and storing that element by said accelerator into the storage area in the accelerator's local storage that is set for the data range whose number corresponds to said computation result wherein in the local storage of each of said plurality of accelerators, a linked list is set for linking elements belonging to a same data range in large bucket that accelerator is partitioning together to form small buckets; and after the step of storing that element by said accelerator into the storage area in the accelerator's local storage that is set for the data range whose number corresponds to said computation result, further comprising:

when it is determined that said storage area is full, writing by said accelerator the elements in the storage area back as a data stripe to position of the large bucket the accelerator is partitioning in the main memory; and updating by said accelerator said linked list in its local storage so as to link that data stripe with other data stripes in that large bucket that belong to a same data range;

wherein the linked list in the local storage of each of said plurality of accelerators is composed of an index list and a tail pointer list, the index list records sequentially, for each data stripe written back into the main memory by said accelerator, position of its previous data stripe that belongs to the same data range as the data stripe, and the tail pointer list indicates positions of the last data stripe of each of said plurality of data ranges written back into the main memory by said accelerator; and the step of updating by said accelerator said linked list in its local storage further comprises:

determining by said accelerator an entry in its tail pointer list corresponding to the data range to which the data stripe written back from said storage area to the main memory belongs;

writing value in said entry into an entry in the index list of that accelerator corresponding to the data stripe written back into the main memory to indicate position of the previous data stripe of that data stripe that belongs to the same data range; and updating value of said entry in said tail pointer list with position of said data stripes in the large bucket said accelerator is partitioning in the main memory to indicate position of the current last data stripe of the data range to which said data stripe belongs.

2. The method according to claim 1, further comprising in each iteration:

among said plurality of large buckets, performing merging of a plurality of small buckets corresponding to a same data range; and determining the buckets in the merged buckets larger than the capacity of the local storage of said plurality of accelerators as new data sets for the next iteration.

3. The method according to claim 2, wherein in the first iteration, the parameters of said data set that can indicate the distribution of data values in that data set are parameters calculated based on that data set that can precisely indicate the distribution of data values in that data set, or are parameters estimated based on that data set that can roughly indicate the distribution of data values in that data set.

4. The method according to claim 3, wherein the step of partitioning said plurality of large buckets into a plurality of small buckets corresponding to the plurality of data ranges respectively by using said plurality of accelerators in parallel in each iteration further comprises:

during the partitioning, generalizing in real time for each of said plurality of small buckets parameters that can precisely indicate the current distribution of data values in that small bucket; and the step of among said plurality of large buckets, performing merging of a plurality of small buckets corresponding to a same data range further comprises:

for each of merged buckets, determining parameters that can precisely indicate the distribution of data values in that merged bucket based on the parameters of the plurality of small buckets contained therein.

5. The method according to claim 1, wherein the step of determining a plurality of data ranges for said data set based on said parameters further comprises:

determining a plurality of consecutive data ranges with fixed step for said data set based on said parameters; and the step of performing computation by each of said plurality of accelerators, for each element in the large bucket the accelerator is partitioning, so that the computation result corresponds to the number of data range to which that element belongs further comprises:

dividing that element by the fixed step of said plurality of consecutive data ranges and performing rounding by said accelerator so that rounding result corresponds to the number of data range to which that element belongs.

6. The method according to claim 1, wherein the step of determining a plurality of data ranges for said data set based on said parameters further comprises:

determining a plurality of data ranges according to weighted sum of a plurality of bits of binary representation of data based on said parameters; and the step of performing computation by each of said plurality of accelerators, for each element in the large bucket the accelerator is partitioning, so that the computation result corresponds to the number of data range to which that element belongs further comprises:

computing weighted sum of the plurality of bits of binary representation of that element by said accelerator so that value of the weighted sum corresponds to the number of data range to which that element belongs.

7. The method according to claim 1, wherein a linked list is set in the main memory for linking elements in said data set that belong to a same data range together, the linked list is composed of an index list and a tail pointer list; and after the step of updating by said accelerator said linked list in its local storage, further comprising:

when the index list in the local storage of said accelerator is full, writing content of that index list into a portion within the index list of the main memory corresponding to the large bucket that accelerator is partitioning.

8. The method according to claim 7, wherein the step of among said plurality of large buckets, performing merging of a plurality of small buckets corresponding to a same data range further comprising:

modifying said index list and said tail pointer list in the main memory so that each entry therein changes to indicate a global position of corresponding data stripe in the whole data set to replace that originally indicating a position of that data stripe in the large bucket it belongs to, as well as head and tail indexes are linked with each other among said plurality of large buckets.

9. The method according to claim 1, wherein said parameters comprise one or more of average/variance, minimal value and maximal value of data values.

10. An apparatus for partitioning a data set in a multi-processor system, wherein the multi-processor system has at least one core processor and a plurality of accelerators, the apparatus partitions iteratively said data set into a plurality of buckets corresponding to different data ranges by using said plurality of accelerators in parallel, wherein each of the plurality of buckets could be stored in local storage of said plurality of accelerators, the apparatus comprising:

a rough partitioning unit for roughly partitioning said data set into a plurality of large buckets in each iteration;

a parameter obtaining unit for obtaining parameters of said data set that can indicate the distribution of data values in that data set in each iteration;

a data range determining unit for determining a plurality of data ranges for said data set based on said parameters in each iteration; and a fine partitioning unit for partitioning said plurality of large buckets into a plurality of small buckets corresponding to the plurality of data ranges respectively by using said plurality of accelerators in parallel, wherein each of said plurality of accelerators, for each element in the large bucket it is partitioning, determines a data range to which that element belongs among the plurality of data ranges by computation;

a bucket merging unit for performing merging of a plurality of small buckets corresponding to a same data range among said plurality of large buckets in each iteration; and a re-partition bucket determining unit for, in each iteration, determining the buckets in the merged buckets larger than the capacity of the local storage of said plurality of accelerators as new data sets to be partitioned;

wherein in the local storage of each of said plurality of accelerators, storage areas are set for said plurality of data ranges, respectively; and said fine partitioning unit further comprises:

a data range numbering unit for numbering the plurality of data ranges in each iteration;

a computing unit for enabling each of said plurality of accelerators to perform computation, for each element in the large bucket the accelerator is partitioning, so that the computation result corresponds to the number of data range to which that element belongs in each iteration; and a data categorizing unit for enabling each of said plurality of accelerators to store each element in the large bucket the accelerator is partitioning, into the storage area in the accelerator's local storage corresponding to the data range the element belongs to based on said computation result;

wherein in the local storage of each of said plurality of accelerators, a linked list is set for linking elements belonging to a same data range in large bucket that accelerator is partitioning together to form small buckets, and the linked list is composed of an index list and a tail pointer list; and said fine partitioning unit further comprises:

a data stripe writing back unit for, when a storage area of one of said plurality of accelerators is full after the accelerator wrote an element in the storage area, enabling the accelerator to write the elements in the storage area back as a data stripe to position of the large bucket the accelerator is partitioning in the main memory in each iteration; and a linked list updating unit for, after one of said plurality of accelerators wrote back a data stripe to the main memory, enabling said accelerator to update said linked list in its local storage so as to link that data stripe with other data stripes in that large bucket the accelerator is partitioning, that belong to a same data range in each iteration;

wherein a linked list is set in the main memory for linking elements in said data set that belong to a same data range together, the linked list is composed of an index list and a tail pointer list; and said fine partitioning unit further comprises:

an index writing back unit for, when determining that the index list of one of said plurality of accelerators is full, enabling said accelerator to write content of the index list into a portion within the index list of the main memory which corresponds to the large bucket the accelerator is partitioning in each iteration;

said bucket merging unit further comprises:

an index merging unit for, in each iteration, modifying said index list and said tail pointer list in the main memory so that each entry therein changes to indicate a global position of corresponding data stripe in the whole data set to replace that originally indicating a position of that data stripe in the large bucket it belongs to, and head and tail indexes are linked with each other among said plurality of large buckets.

11. The apparatus according to claim 10, wherein said fine partitioning unit further comprises:

a parameter generalizing unit for, in each iteration, enabling each of said plurality of accelerators to generalize in real time for each of said plurality of small buckets partitioned by it parameters that can precisely indicate the current distribution of data values in that small bucket during partitioning; and said bucket merging unit further comprising:

a parameter merging unit for, in each iteration, for each of merged buckets, determining parameters that can precisely indicate the distribution of data values in that merged bucket based on the parameters of the plurality of small buckets contained in the merged bucket, that are generalized by the parameter generalizing unit.

* * * * *